United States Patent
Hung

(10) Patent No.: US 7,425,157 B1
(45) Date of Patent: Sep. 16, 2008

(54) MEMORY CARD ADAPTER

(75) Inventor: Pei-Chiau Hung, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/902,673

(22) Filed: Sep. 25, 2007

(51) Int. Cl.
*H01R 24/00* (2006.01)

(52) U.S. Cl. .................. 439/630; 439/639; 439/945

(58) Field of Classification Search ......... 439/630–632, 439/639, 945
See application file for complete search history.

(56) References Cited

U.S. PATENT DOCUMENTS

| | | | |
|---|---|---|---|
| 7,210,967 B1 * | 5/2007 | Lee | 439/630 |
| 7,249,975 B1 * | 7/2007 | Liu | 436/630 |
| 7,320,622 B2 * | 1/2008 | Ying et al. | 439/630 |
| 7,357,677 B2 * | 4/2008 | Liu | 439/630 |

* cited by examiner

*Primary Examiner*—Truc T Nguyen
(74) *Attorney, Agent, or Firm*—Rosenberg, Klein & Lee

(57) ABSTRACT

A memory card adapter includes a cover, a base, a connecting apparatus and a flexible strip. An inserting groove is formed between the cover and the base. Two retaining walls are arranged in two sides of the base. An opening is opened in the retaining wall and connects the inserting groove. The connecting apparatus is fixed in the rear of the base. The flexible strip includes a main part showing a strip shape, an extending end formed in the front end of the main part and against the outside of the retaining wall, and a bending portion formed between the main part and the extending end and protruding into the inserting groove from the opening of the retaining wall. The flexible strip can fasten a Micro SD card in the memory card adapter firmly, while the Micro SD card is inserted.

3 Claims, 5 Drawing Sheets

MEMORY CARD ADAPTER

BACKGROUND OF THE INVENTION

1. Field of the Invention

This present invention relates to an adapter, and more specifically to a memory card adapter, by which a Micro SD card can be read by a standard memory card interface.

2. The Related Art

As the volume of the electrical product decreasing, a small size memory card is used in the electrical product more and more, such as Mini SD card and Micro SD card. The small size memory card cannot deliver information stored in the memory card into the electrical product by a traditional memory card connector. The small size memory card must be transformed into the SD card standard by a card adapter to deliver information. For the small volume of the small size memory card, while the small size memory card is inserted into the card adapter, the small size memory card is not located in the card adapter, as a result the signal is not delivered stably between the small size memory card and the card adapter.

U.S. Pub. NO. 2007/0026740 discloses an adapter card structure. The adapter card structure is used for adapting a Mini SD/Micro SD card to a SD card. A casing is opened in the adapter card structure, a stick is formed in the side of the casing. While the Mini SD/Micro SD card is inserted into the adapter card structure, the Mini SD/Micro SD card can be latched firmly in the adapter card structure for a projection part formed in the tail end of the stick against a notch opened at an edge of the Mini SD/Micro SD card.

Because the stick is ejected with the casing of the adapter card structure, the stick is not easily manufactured, and the volume of the casing is smaller, the casing is not easily manufactured also.

SUMMARY OF THE INVENTION

An object of the invention is to provide a memory card adapter comprising a cover, a base, a connecting apparatus and a flexible strip. A first rectangular space is opened in the middle of the cover. A right and left retaining walls are arranged symmetrically in two sides of the base, a second rectangular space is defined between the retaining walls. An incline is arranged in the second rectangular space and vertical to the retaining walls. The first and second rectangular spaces define an inserting groove to accept an outer memory card. An opening is opened in right retaining wall and connects the inserting groove. The connecting apparatus includes a housing and a plurality of electrical terminals arranged in the housing. The connecting apparatus is fixed in the rear of the base. The front ends of the electrical terminals are located in the rear of the incline. The flexible strip includes a main part showing a strip shape, an extending end formed in the front end of the main part and against the outside of the right retaining wall, and a bending portion formed between the main part and the extending end and protruding into the inserting groove from the opening of the right retaining wall.

As above description, the flexible strip can fasten a Micro SD card in the memory card adapter firmly, while the Micro SD card is inserted into the memory card adapter, and for the incline design, the Micro SD card will not destroy the electrical terminals in the memory card adapter while the Micro SD card is pushed into the memory card adapter.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 1:
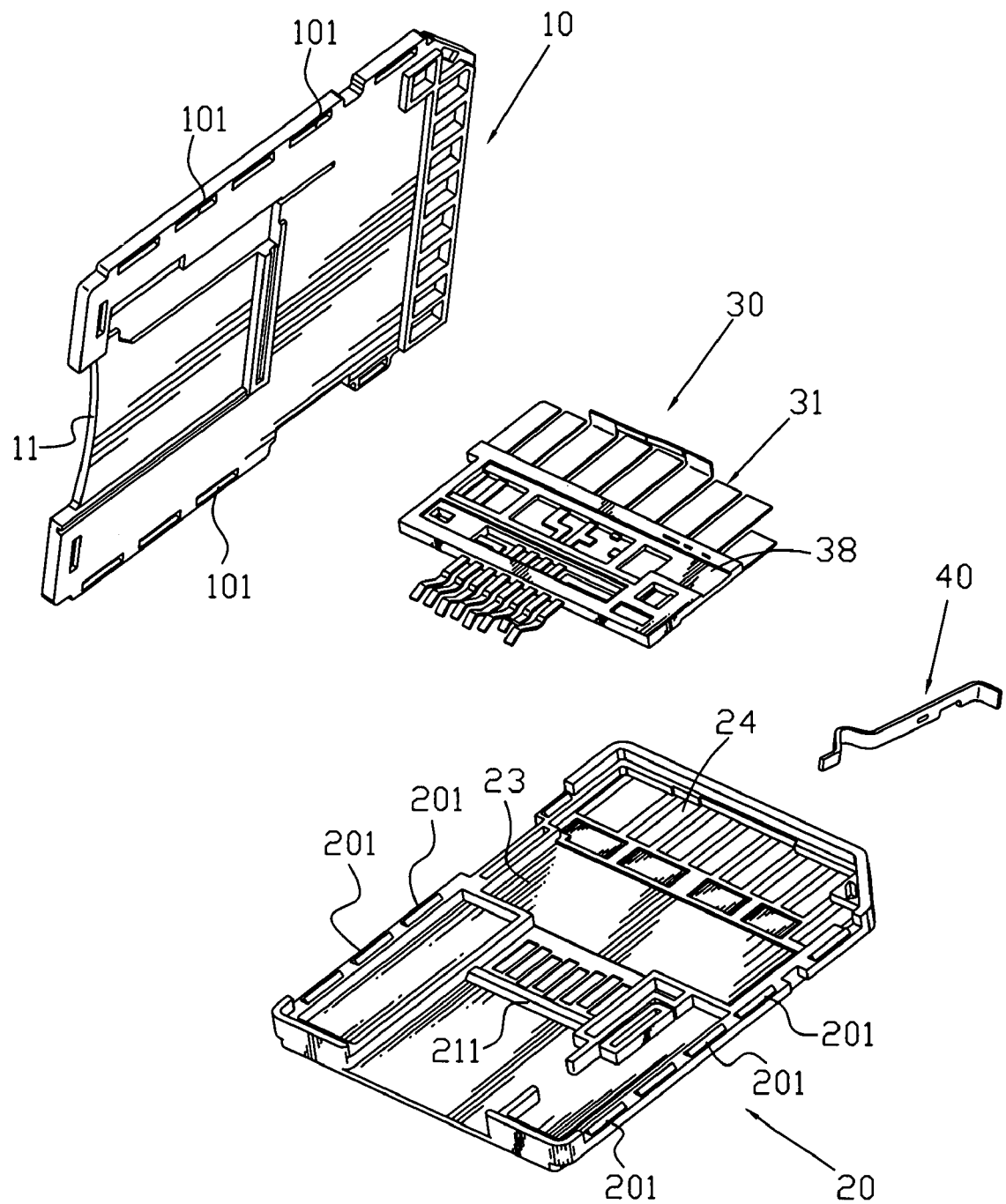
FIG. 1 is an exploded perspective view of a memory card adapter according to the present invention.

First referring to FIG. 1, a memory card adapter 1 according to the invention is shown. The memory card adapter 1 includes a cover 10, a base 20, a connecting apparatus 30 and a flexible strip 40. An arc hollow section 11 is formed in the front end of the cover 10, a first rectangular space is defined in the middle of the cover 10. A plurality of grooves 101 are opened in the sides of the cover 10.

Figure 2:
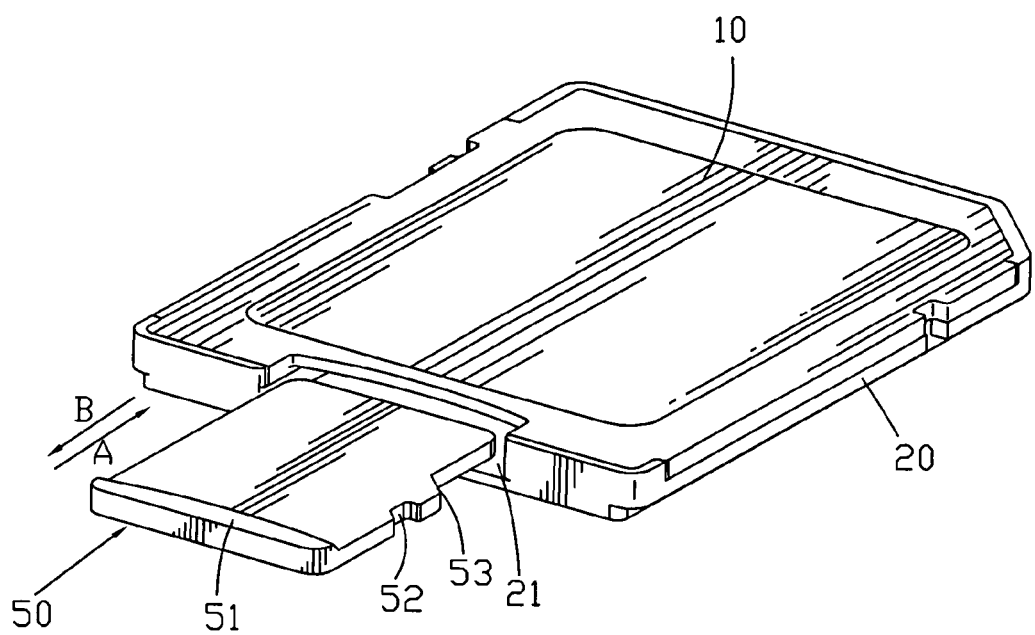
FIG. 2 is an assembled perspective view of the memory card adapter.

The base 20 defines a second rectangular space in the middle thereof. A plurality of projections 201 are arranged in two sides of the base 20 and accord to the grooves 101 in the cover 10. In FIG. 2, the projections 201 are accepted in the grooves 101, so the cover 10 is located on the base 20 as a whole. The first and second rectangular spaces match each other to form an inserting groove 21 to accept a Micro SD card 50 while the cover 10 is located on the base 20 as a whole. The Micro SD card 50 shows a rectangular shape, a stopping portion 51 is arranged on the front end of the Micro SD card 50. An indent 52 is opened in a right side of the middle of the Micro SD card 50, a front end of the right side of the Micro SD card 50 is cut and forms a pressing surface 53 near to the indent 52.

Figure 3:
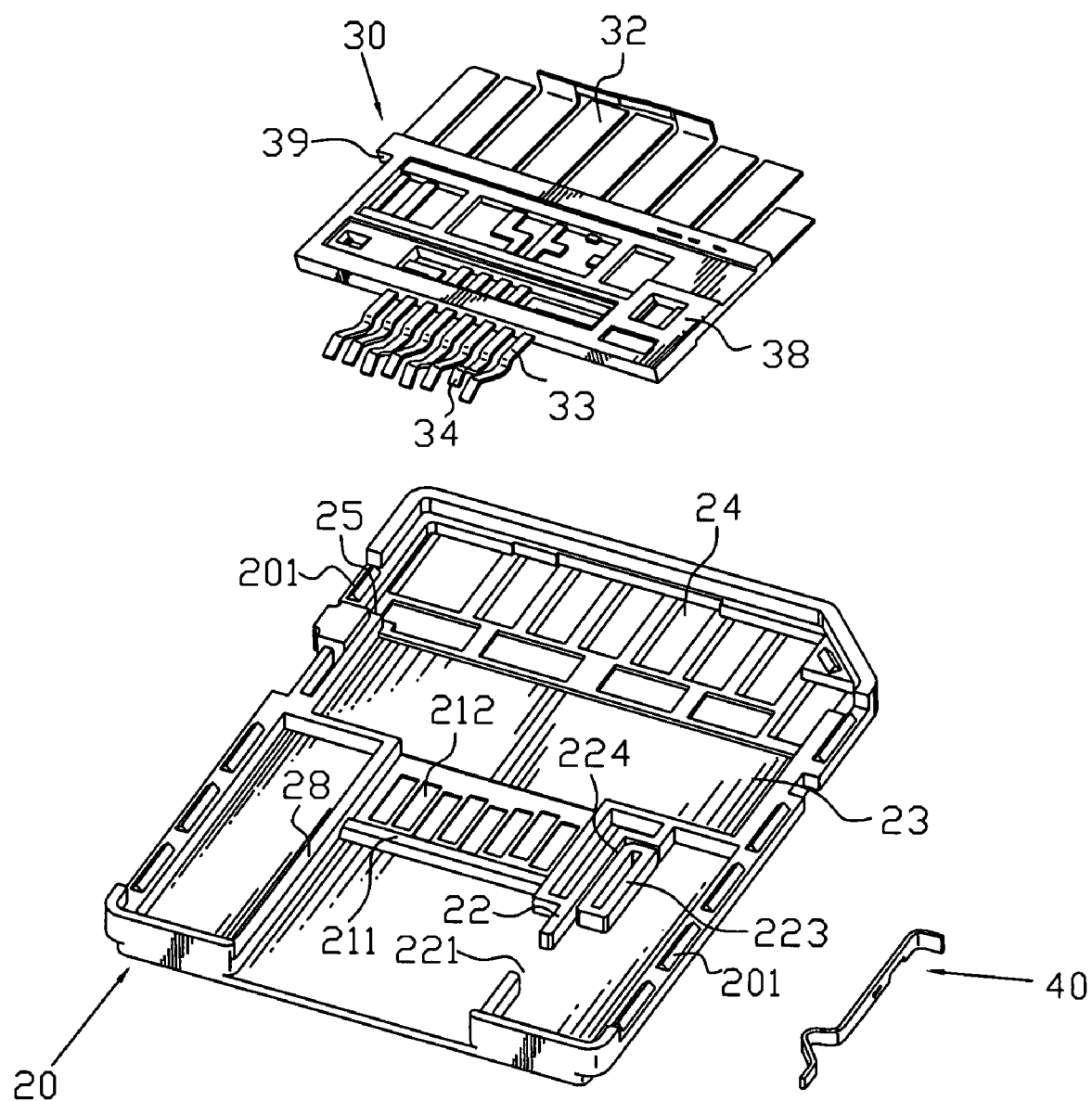
FIG. 3 is an exploded perspective view showing a base, a connecting apparatus and a flexible strip of the memory card adapter.
Figure 4:
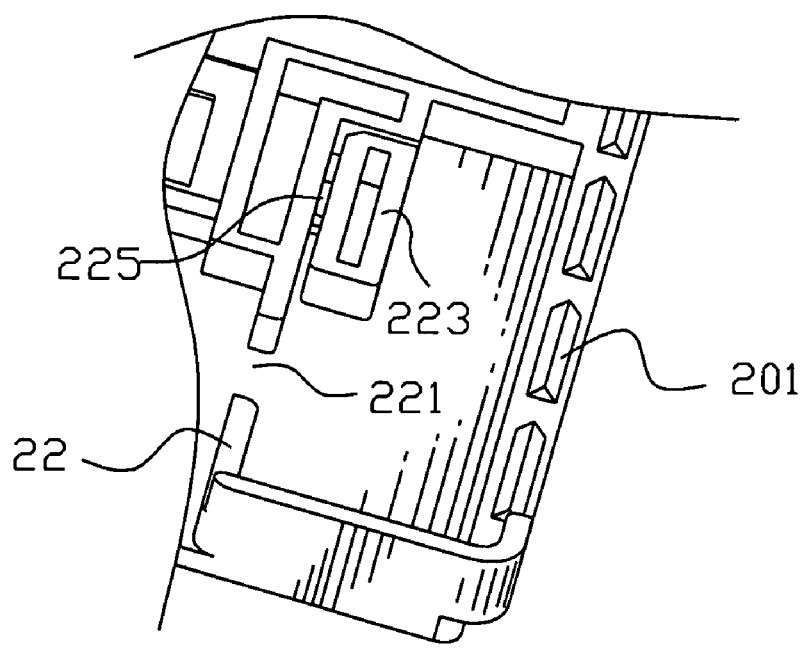
FIG. 4 is a partial enlarged view of the base in FIG. 3.

Please refer to FIGS. 3 and 4, a right retaining wall 22 and a left retaining wall 28 are arranged symmetrically in the right and left sides of the base 20. An opening 221 is opened in the right retaining wall 22 to cut off the right retaining wall 22. A position lump 223 is arranged in the rear end of the outside of the right retaining wall 22 and has a space with the right retaining wall 22 to form an L-shape position groove 224 between the right retaining wall 22 and the position lump 223. A clicking lump 225 is arranged in the position groove 224. An incline 211 is arranged between the right retaining wall 22 and left retaining wall 28 to separate the inserting groove 21 into two sections. The base of the inserting groove 21 is in a same horizontal plane. A plurality of conducting grooves 212 are abreast arranged in the base 20 and in the rear of the incline 211.

Referring to FIG. 3 again, in order to accept the connecting apparatus 30, a plurality of connecting holes 24 is opened in the rear of the base 20, and a rectangle trough 23 is opened in the middle of the base 20. A clicking corner 25 is arranged in the corner of the rectangle trough 23.

Please refer to FIGS. 1 and 3, the connecting apparatus 30 is used to connect the Micro SD card 50 with an outer apparatus. The connecting apparatus 30 includes a housing 38 showing a rectangular board and a plurality of electrical terminals 31 arranged in the housing 38. A resisting portion 39 extends outward from the rear end of one side of the housing 38. The electrical terminal 31 includes a rear portion 32 showing a flat shape and a contacting portion 33 extended from the front end of the rear portion 32. The contacting portion 33 is long and thin. The front end of the contacting portion 33 is bent to form a spring portion 34 showing a projection like. While the connecting portion 30 is arranged, the electrical terminals 31 are inserted into the housing 38, the rear portion 32 are equably arranged in the rear side of the housing 38, the contacting portion 33 are arranged in the front side of the housing 38.

Figure 5:
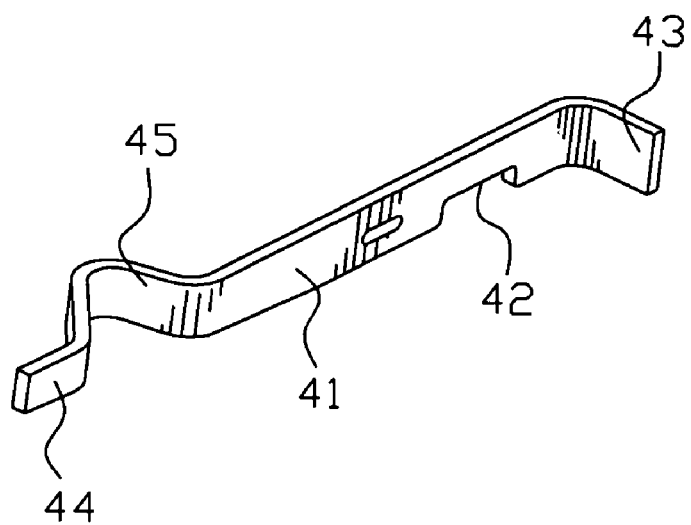
FIG. 5 is a perspective view of the flexible strip.

Referring to FIG. 5, the flexible strip 40 is made of metal material showing an L-shape. The flexible strip 40 has a main part 41 like a bar. A gap 42 is opened in the bottom of the main part 41. A clasp 43 is formed in the end of the main part 41. An extending end 44 is formed in the front end of the flexible strip 40, a bending portion 45 showing a V-shape is formed between the main part 41 and the extending end 44. The shape of the bending portion 45 accords to the indent 52 of the Micro SD card 50. The front of the bending portion 45 accords to the pressing surface 53 of the Micro SD card 50, to make the Micro SD card 50 pull out or insert into the memory card adapter 1 easily.

Figure 6:
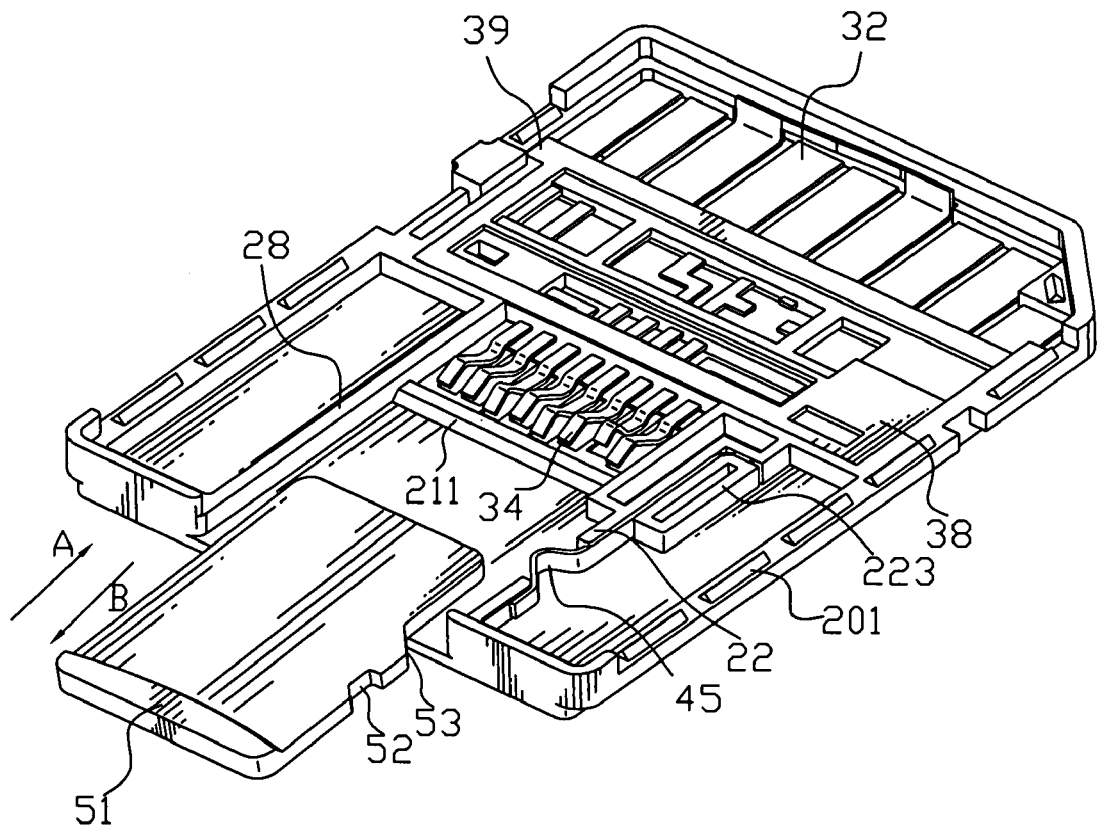
FIG. 6 is a perspective view showing a memory card inserted into the memory card adapter (not shown a cover of the memory card adapter).

Please refer to FIG. 6, while the connecting apparatus 30 is fixed in the base 20, the housing of the connecting apparatus 30 is accepted in the rectangle trough 23, the resisting portion 39 is against the clicking corner 25, the rear portions 32 of the electrical terminals 30 are accepted in the connecting holes 24, the contacting portions 33 are arranged in the conducting grooves 212. The main part 41 and the clasp 43 of the flexible strip 40 are accepted in the position groove 224, the extending end 44 is against the outside of the right retaining wall 22, the bending portion 45 is accepted in the opening 221 and extends to the inserting groove 21, the gap 42 covers the clicking lump 225.

Please refer to FIGS. 2 and 6, while the Micro SD card 50 is inserted into the inserting groove 21 of the memory card adapter 1 along direction A, the pressing surface 53 presses the front of the bending portion 45 of the flexible strip 40, the extending end 44 and the bending portion 45 are curved, the front end of the Micro SD card 50 passes through the incline 211 and connects the electrical terminals 31, so the Micro SD card 50 can be inserted into the inserting groove 21, the stopping portion 51 is against the hollow section 11 of the cover 10, the electrical terminals of the Micro SD card 50 connect the electrical terminals 31 of the connecting apparatus 30. Then the bending portion 45 is accepted in the indent 52, the Micro SD card 50 can be fixed in the memory card adapter 1 firmly. While the Micro SD card 50 is pulled out from the memory card adapter 1, the Micro SD card 50 is withdrawn along direction B from the memory card adapter 1, the bending portion 45 is extruded from the indent 52. For the incline 211 design, while the Micro SD card 50 is inserted into the memory card adapter 1, the electrical terminals 31 will be not destroyed by the front end of the Micro SD card 50.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A memory card adapter, comprising:
   a cover having a first rectangular space defined in the middle of the cover;
   a base, the base having a left retaining wall and a right retaining wall arranged in two sides of the base, a second rectangular space defined between the left and right retaining walls, the first rectangular space and the second rectangular space cooperatively defining an inserting groove to accept an outer memory card, a position lump arranged adjacent to one side of the right retaining wall opposite to the inserting groove, a position groove formed between the right retaining wall and the position lump, a clicking lump arranged in the position groove, an opening opened in the right retaining wall and connecting the inserting groove;
   a connecting apparatus fixed in the rear of the base, the connecting apparatus including a housing and a plurality of electrical terminals arranged in the housing; and
   a flexible strip, including a main part fixed in the position groove, an extending end formed in the front end of the main part and against the outside of the right retaining wall, a gap defined in the bottom of the main part and covering the clicking lump of the base, and a bending portion connecting the main part and the extending end and protruding into the inserting groove from the opening of the right retaining wall.

2. The memory card adapter as set forth in claim 1, wherein the rear of the main part bends to form a clasp, the clash received in the rear of the position groove.

3. The memory card adapter as set forth in claim 1, further comprising an incline arranged between the left retaining wall and the right retaining wall, two sides of the incline is in a same horizontal plane.

* * * * *